US00RE44623E

(19) United States
(12) Reissued Patent
Sorensen

(10) Patent Number: US RE44,623 E
(45) Date of Reissued Patent: Dec. 3, 2013

(54) APPARATUS AND METHOD FOR DOWNLOADING AND STORING DATA FROM A DIGITAL RECEIVER

(75) Inventor: Tom L. Sorensen, Naperville, IL (US)

(73) Assignee: LG Electronics Inc., Youngdungpo-Gu, Seoul (KR)

(21) Appl. No.: 13/608,327

(22) Filed: Sep. 10, 2012

Related U.S. Patent Documents

Reissue of:

(64) Patent No.: 6,628,729
Issued: Sep. 30, 2003
Appl. No.: 09/439,516
Filed: Nov. 12, 1999

U.S. Applications:

(63) Continuation of application No. 12/830,853, filed on Jul. 6, 2010, now Pat. No. Re. 43,671, which is a continuation of application No. 11/931,910, filed on Oct. 31, 2007, now Pat. No. Re. 42,620, which is a continuation of application No. 11/239,628, filed on Sep. 29, 2005.

(51) Int. Cl.
*H04L 27/00* (2006.01)
*H04N 5/44* (2011.01)
*H04N 5/445* (2011.01)

(52) U.S. Cl.
USPC ..... 375/316; 348/734; 725/39

(58) Field of Classification Search
USPC ..... 375/316, 219, 295; 340/825.22; 348/734, 715, 589, 552, 563; 703/27; 707/9, 10; 341/176; 725/39, 40
See application file for complete search history.

(56) References Cited

U.S. PATENT DOCUMENTS 4,568,909 A 2/1986 Whynacht
4,746,983 A 5/1988 Hakamada
4,903,129 A 2/1990 Bell et al.
(Continued)

FOREIGN PATENT DOCUMENTS

EP 710 017 5/1996
EP 0710017 5/1996
(Continued)

OTHER PUBLICATIONS

Mitsubishi Takes Motorola MPC801 for Diamondweb TV Computergram Intl., Aug. 29, 1996.
(Continued)

*Primary Examiner* — Khai Tran
(74) *Attorney, Agent, or Firm* — Schiff Hardin LLP

(57) ABSTRACT

A portable data storage device receives data from a digital broadcast signal receiver that is adapted to separate the data from a digital broadcast signal. The portable data storage device includes a first transceiver that communicates with a second transceiver associated with the digital broadcast signal receiver and further includes a memory for storing the received data. A processor disposed within the portable data storage device controls the storage of the data and further causes a data request signal to be generated and transmitted to the digital broadcast signal receiver. A controller disposed within the digital broadcast signal receiver responds to the data request signal by causing the data separated from the digital broadcast signal to be transmitted via the second transceiver to the portable data storage device. The portable data storage device further includes a data communication port for transferring the data to a personal computer.

10 Claims, 1 Drawing Sheet

(56) References Cited

U.S. PATENT DOCUMENTS

| | | | |
|---|---|---|---|
| 5,192,854 | A | 3/1993 | Counts |
| 5,237,418 | A | 8/1993 | Kaneko |
| 5,268,928 | A | 12/1993 | Herh et al. |
| 5,371,573 | A | 12/1994 | Kagaya et al. |
| 5,380,991 | A | 1/1995 | Valencia et al. |
| 5,432,561 | A | 7/1995 | Strubbe |
| 5,453,796 | A | 9/1995 | Duffield et al. |
| 5,519,780 | A | 5/1996 | Woo et al. |
| 5,594,509 | A | 1/1997 | Florin et al. |
| 5,604,542 | A | 2/1997 | Dedrick |
| 5,638,113 | A | 6/1997 | Lappington et al. |
| 5,650,831 | A | 7/1997 | Farwell |
| 5,665,953 | A | 9/1997 | Mazzamuto et al. |
| 5,666,293 | A | 9/1997 | Metz et al. |
| 5,699,104 | A | 12/1997 | Yoshinobu |
| 5,710,605 | A | 1/1998 | Nelson |
| 5,734,413 | A | 3/1998 | Lappington et al. |
| 5,754,864 | A | 5/1998 | Hill |
| 5,761,606 | A | 6/1998 | Wolzien |
| 5,767,897 | A | 6/1998 | Howell |
| 5,774,664 | A | 6/1998 | Hidary et al. |
| 5,774,666 | A | 6/1998 | Portuesi |
| 5,778,181 | A | 7/1998 | Hidary et al. |
| 5,784,095 | A | 7/1998 | Robbins et al. |
| 5,801,753 | A | 9/1998 | Eyer et al. |
| 5,818,441 | A | 10/1998 | Throckmorton et al. |
| 5,818,935 | A | 10/1998 | Maa |
| 5,844,552 | A | 12/1998 | Gaughan et al. |
| 5,872,588 | A | 2/1999 | Aras et al. |
| 5,880,769 | A | 3/1999 | Nemirofsky et al. |
| 5,889,506 | A | 3/1999 | Lopresti |
| 5,892,536 | A | 4/1999 | Logan et al. |
| 5,905,476 | A | 5/1999 | McLaughlin et al. |
| 5,907,322 | A | 5/1999 | Kelly et al. |
| 5,923,379 | A | 7/1999 | Patterson |
| 5,929,849 | A | 7/1999 | Kikinis |
| 5,940,073 | A | 8/1999 | Klostermann et al. |
| 5,940,074 | A | 8/1999 | Britt et al. |
| 5,946,047 | A | 8/1999 | Levan |
| 5,977,963 | A | 11/1999 | Gaughan et al. |
| 5,978,013 | A | 11/1999 | Jones |
| 6,002,394 | A | 12/1999 | Schein |
| 6,002,450 | A | 12/1999 | Darbee et al. |
| 6,008,836 | A | 12/1999 | Bruck et al. |
| 6,018,768 | A | 1/2000 | Ullman et al. |
| 6,031,867 | A | 2/2000 | Johnson et al. |
| 6,034,689 | A | 3/2000 | White et al. |
| 6,040,829 | A | 3/2000 | Croy et al. |
| 6,073,171 | A | 6/2000 | Gaughan et al. |
| 6,097,383 | A | 8/2000 | Gaughan et al. |
| 6,097,441 | A | 8/2000 | Allport |
| 6,104,334 | A | 8/2000 | Allport |
| 6,130,726 | A | 10/2000 | Darbee et al. |
| 6,137,839 | A | 10/2000 | Mannering et al. |
| 6,175,831 | B1 | 1/2001 | Weinreich et al. |
| 6,177,931 | B1 | 1/2001 | Alexander et al. |
| 6,181,326 | B1 | 1/2001 | Takahashi |
| 6,182,287 | B1 | 1/2001 | Schneidewend et al. |
| 6,219,839 | B1 | 4/2001 | Sampsell |
| 6,240,555 | B1 | 5/2001 | Shoff et al. |
| 6,272,680 | B1 | 8/2001 | Gaughan et al. |
| 6,278,499 | B1 | 8/2001 | Darbee et al. |
| 6,282,713 | B1 | 8/2001 | Kitsukawa et al. |
| 6,313,887 | B1 | 11/2001 | Gudorf |
| 6,317,885 | B1 * | 11/2001 | Fries ..... 725/109 |
| 6,349,410 | B1 | 2/2002 | Lortz |
| 6,374,245 | B1 | 4/2002 | Park |
| 6,397,387 | B1 | 5/2002 | Rosin et al. |
| 6,401,059 | B1 | 6/2002 | Shen et al. |
| 6,437,836 | B1 | 8/2002 | Huang et al. |
| 6,732,369 | B1 | 5/2004 | Schein et al. |
| 6,785,906 | B1 | 8/2004 | Gaughan et al. |
| 6,792,616 | B1 | 9/2004 | Jerding et al. |
| 6,802,076 | B1 | 10/2004 | Terakado et al. |
| 6,882,299 | B1 | 4/2005 | Allport |
| 6,925,444 | B1 | 8/2005 | McCollom |
| 6,978,471 | B1 | 12/2005 | Klopfenstein |
| 7,028,330 | B1 | 4/2006 | Gaughan et al. |
| 7,340,763 | B1 | 3/2008 | Harris |
| 7,372,915 | B1 | 5/2008 | Sako et al. |
| 7,823,181 | B2 | 10/2010 | Gaughan et al. |
| 7,827,583 | B2 | 11/2010 | Gaughan et al. |
| 2001/0003099 | A1 | 6/2001 | Von Kohorn |
| 2002/0059637 | A1 | 5/2002 | Rakib |
| 2003/0204854 | A1 * | 10/2003 | Blackketter et al. ..... 725/113 |
| 2005/0111823 | A1 | 5/2005 | Dureau |
| 2007/0067805 | A1 | 3/2007 | Macrae et al. |
| 2009/0091657 | A1 | 4/2009 | Gaughan et al. |
| 2009/0100485 | A1 | 4/2009 | Gaughan et al. |
| 2010/0146551 | A1 | 6/2010 | Barton et al. |

FOREIGN PATENT DOCUMENTS

| | | |
|---|---|---|
| WO | 9637996 | 11/1996 |
| WO | 9847286 | 10/1998 |
| WO | 9857497 | 12/1998 |
| WO | 9913644 | 3/1999 |

OTHER PUBLICATIONS

Comdex—Mitsubishi Previews 40-inch DiamondWeb TV Nov. 19, 1996, Newsbytes.

Mitsubishi joins Internet TV market Screen Digest, Dec. 1, 1996.

Sony Internet Web page "Now Everyone can experience the Internet", 1996.

International Search Report in International (PCT) Application No. PCT/US00/41255, dated Feb. 23, 2001.

* cited by examiner

APPARATUS AND METHOD FOR DOWNLOADING AND STORING DATA FROM A DIGITAL RECEIVER

Matter enclosed in heavy brackets [ ] appears in the original patent but forms no part of this reissue specification; matter printed in italics indicates the additions made by reissue.

*CROSS-REFERENCE TO RELATED APPLICATION*

*The present application is a continuation of reissue application Ser. No. 12/830,853 filed Jul. 6, 2010 now U.S. Pat. No. Re. 43,671, which is a continuation of reissue application Ser. No. 11/931,910, filed Oct. 31, 2007,—now issued as U.S. Pat. No. Re. 42,620 on Aug. 16, 2011—which is a continuation of reissue application Ser. No. 11/239,628, filed Sep. 29, 2005, which is reissue of U.S. Pat. No. 6,628,729, issued on Sep. 30, 2003. The present application is related to reissue application Ser. No. 12/830,874, filed Jul. 6, 2010,—now issued as U.S. Pat. No. Re. 43,578 on Aug. 14, 2012—and to reissue application Ser. No. 11/397,472 filed Apr. 3, 2006.*

TECHNICAL FIELD OF THE INVENTION

The present invention relates to an apparatus that enables a user to download data from a digital receiver and to store the downloaded data.

BACKGROUND OF THE INVENTION AND PRIOR ART

The ATSC digital broadcast standard for digital television allows for the transmission of 19 Mbits/sec in an RF channel having a 6 MHZ bandwidth. Although this allocated bandwidth is adequate for a single analog NTSC television channel, the ATSC bit rate permits the same channel to support the concurrent transmission of several standard definition television (SDTV) programs (i.e., programs displayable with a resolution comparable to that of the NTSC analog program). Alternatively, the allocated bandwidth at the ATSC bit rate permits a channel to support the transmission of a single high definition television (HDTV) program at a time. Moreover, the ATSC digital broadcast standard permits data to be transmitted in the channel along with digital programming. Therefore, data packets may be multiplexed in the channel with video and audio program packets.

Various receivers, such as digital televisions, digital VCRs, and computers equipped with digital television tuner and demodulator cards, may receive the digital programming. Because data may be transmitted along with one or more programs in a digital RF channel, it is possible to transmit program content that includes data. Such program content, for example, may be a commercial with an embedded uniform resource locator (URL) associated with a website containing additional information about the product or service being advertised or may include a coupon for the advertised product.

Because the program content that includes the Internet address is broadcast in a digital RF channel, it is also receivable by digital receivers other than computers, such as digital televisions. However, typical digital televisions are not web enabled. Therefore, the user of such a digital television has no access to the additional information linked to the Internet address embedded in a received program if the user does not also have a computer with a tuner and demodulator card.

The present invention is directed to a device and method which permit remote access to data, such as an Internet address, embedded in a program received by a digital receiver.

SUMMARY OF THE INVENTION

In accordance with one aspect of the present invention, a data retrieval system for retrieving data from a digital broadcast signal is provided. The digital broadcast signal includes at least one television programming packet and at least one data packet that contains the data. The data retrieval system comprises a digital receiver adapted to receive the digital broadcast signal and adapted to separate the data from the digital broadcast signal and further comprises a portable data storage device in communication with the digital receiver and adapted to receive the data from the digital receiver and further adapted to store the data.

In accordance with another aspect of the present invention, a personal digital assistant has an input device, an output device, a memory, and a controller. The controller is arranged to read data at the input device which is acquired from a digital receiver that receives the data in a digital broadcast signal. The controller is further arranged to cause the data to be stored in the memory and to cause the data to be transferred from the memory to the output device.

In accordance with yet another aspect of the present invention, a method of retrieving data transmitted in a digital broadcast signal comprises the steps of a) acquiring the data from a digital receiver that receives the digital broadcast signal; b) storing the data in a-memory that is separate from the digital receiver; and c) transferring the data from the memory to a computer that is separate from the digital receiver.

BRIEF DESCRIPTION OF THE DRAWINGS

The features and advantages of the present invention will become more apparent from a detailed consideration of the invention when taken in conjunction with the drawings in which.

DESCRIPTION OF THE PREFERRED EMBODIMENT

Figure 1:
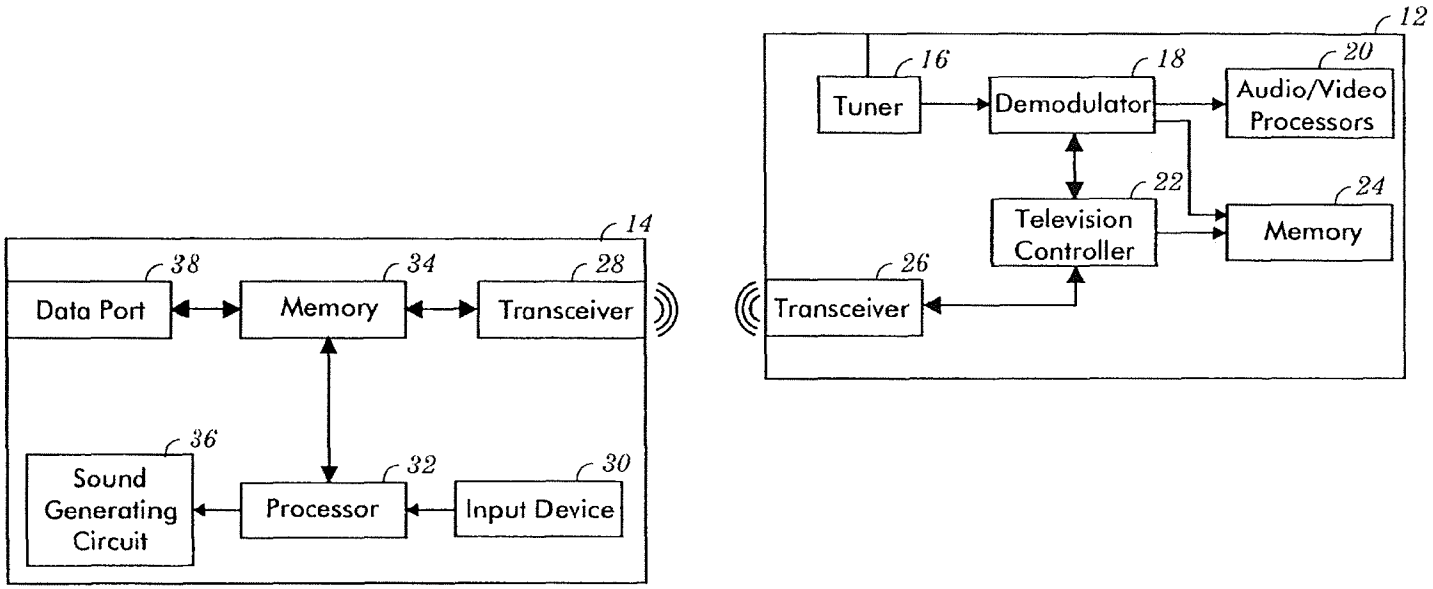
FIG. 1 illustrates a data retrieval system including a digital receiver and a personal digital assistant according to one embodiment of the present invention.

As shown in FIG. 1, a data retrieval system 10 includes a digital receiver 12, and a personal digital assistant (PDA) 14. The digital receiver 12 is assumed to be a digital television. However, as noted below, the digital receiver 12 may be other types of digital equipment. Assuming that the digital receiver 12 is a digital television, the digital receiver 12 includes a tuner 16 for tuning to one of a plurality of RF channels. The output of the tuner 16 is demodulated by a digital VSB demodulator 18 in order to recover the baseband digital signal which includes digital television (DTV) programming packets multiplexed with data packets. The portion of the baseband digital signal comprising the DTV programming packets is supplied by the digital VSB demodulator 18 to a set of video/audio processors 20 such that the video portion of the baseband digital signal is suitably decoded, processed, and supplied to a display screen [not shown], and such that the audio portion of the baseband digital signal is suitably decoded, processed, and supplied to speakers [not shown]. The tuner 16, the digital VSB demodulator 18, and the video/audio processors 20 are controlled by a television controller 22 as is conventional. The digital VSB demodulator 18, as controlled by the television controller 22, supplies the portion of the digital baseband signal comprising the data packets to a memory 24 for storage.

The data packets transmitted in the digital VSB signal and stored in the memory 24 may or may not be related to the DTV programming transmitted via the DTV programming packets and being displayed by the digital television 12. For example, in one embodiment, the DTV programming includes a television commercial for advertising a product [not shown] and the data packets transmitted therewith include Internet data containing, for example, a URL for a website sponsored by the manufacturer of the product. In another embodiment, the data transmitted with the television commercial includes data for generating a coupon for the product advertised in the commercial. Preferably, but not necessarily, the television commercial prompts the user to download the data for the purpose of retrieving the website URL, or, alternatively, to download the data for the purpose of generating the coupon contained therein.

To enable access to the stored data, the digital television 12 includes an IR transceiver 26 that communicates with an IR transceiver 28 disposed in the PDA 14. The PDA 14 further includes an input device, such as a button pad 30 which includes a set of buttons used to enter, for example, a download command. The download command is thereafter routed to a processor 32 also residing within the PDA 14. In response to the download command, the processor 32 causes the IR transceiver 28 to transmit a download command signal to the transceiver 26 in the digital television 12. The television controller 22 residing within the digital television 12 responds to the download command signal received by the transceiver 26 by causing the data stored in the memory 24 to be transmitted in a data signal by the transceiver 26 to the transceiver 28 of the PDA 14.

When the data signal is received at the PDA 14, the processor 32 of the PDA 14 causes the transceiver 28 to transfer the data in the data signal to a memory 34 coupled to the transceiver 28. Preferably, after the data signal has been received by the transceiver 28 and the data transmitted therein has been stored in the memory 34, the processor 32 causes a sound generating circuit 36 to generate a tone or beep that alerts the user that the data has been successfully retrieved from the digital television 12. Alternatively, the PDA 14 may generate any other notification signal to alert the user that the data has been stored, including, for example, causing a light emitting diode (LED) [not shown] to flash, to remain lit or to change from a flashing state indicating that the data transfer is taking place to a steady on state indicating that data transfer is complete.

A prompt may be included in the program content and may be displayed by the digital receiver 12 either visually or audibly to the user in order to notify the user that internet content is available for retrieval by the FDA 14. When the prompt is present, the user operates the button pad 30 as described above in order to retrieve the internet content if data retrieval is desired. Alternatively, no prompt need be given so that the user operates the PDA 14 on the chance that Internet may be available for retrieval. In this case, the notification signal provided by the PDA 14 indicates to the user whether the Internet content has been retrieved. As a further alternative, when internet content is detected by the television controller 22 and stored in the memory 24, the television controller 22 may be arranged to provide a prompt to the user. Such a prompt may be an on-screen prompt, an audible prompt, or a signal transmitted by the transceiver 26 to the PDA 14 in order to initiate a local prompt by the PDA 14.

Figure 2:
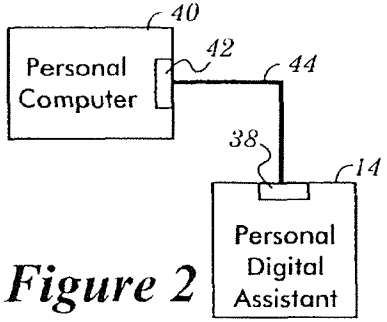
FIG. 2 illustrates the personal digital assistant linked to a personal computer according to another embodiment of the present invention.

Referring also to FIG. 2, to enable the transfer of the data stored in the memory 34 to a micro-processor based device, such as, for example, a personal computer 40, the PDA 14 further includes a data port 38 by which the data is transferred to a data port 42 associated with the personal computer 40. The data ports 38 and 42 may both be serial data ports, such as RS-232 data ports, that are interconnected by a cable 44. Alternatively, the data ports 38 and 42 may instead be wireless transceivers capable of infra-red, radio frequency, or ultrasonic signal transmission/reception and/or the like.

In an embodiment in which the data includes Internet data containing a URL website address, the personal computer 40 preferably includes a software program [not shown] that enables web-browsing and may further be programmed such that the supply of the data stored in the PDA 14 to the data port 42 causes the personal computer 40 to launch the web-browsing software program and further causes the personal computer to seek the URL website address provided at the data port 42.

In a further embodiment, additional data codes that designate the URL website address as having been downloaded from a digital VSB broadcast signal and/or that identify the user could also be included with the website URL data. By reading these additional codes, the website provider could determine which users accessing the website have actually viewed the television commercial. Thus, the present invention offers advertisers a mechanism for indicating the viewership and possibly the success of a given television commercial. Additionally, these codes could be used to enable the user to download a coupon from the website that would not otherwise be accessible.

If the data stored in the PDA 14 contains coupon generating data instead of Internet data, then the data, upon being transferred to the personal computer 40, may be used by the personal computer 40 to print the coupon [not shown]. Alternatively, the coupon provided in the data signal may be an electronic coupon that is redeemable by bringing the PDA 14 to a retailer having the capability to download the data from the PDA 14. The coupon information could also be downloaded to a device that stores the data on a smart card [not shown] that is scanned for redemption by a retailer. In a still further embodiment, instead of generating a coupon, the data downloaded from the PDA 14 may be used by the personal computer 40 to generate an advertisement that lists, for example, retailers that carry the advertised product, the location of such retailers and sale information for the advertised product.

The data transmitted via the digital VSB broadcast signal may include a variety of information that may be of varying degrees of interest to the user. For example, the data may include both an electronic coupon and a website URL. However, the user may only be interested in obtaining the electronic coupon. To enable download of the electronic coupon exclusively, the processor 32 of the PDA 14 is programmed to be able to analyze the data received by the transceiver 28 for the purpose of identifying the desired portions of the data for subsequent storage in the memory 34. Moreover, the keypad 30 of the FDA 14 preferably includes buttons that enable the user to specify which portions of the data signal are desired. Alternatively, the processor 32 may simply be programmed to store all of the received data in the memory 34 and in response to a user-entered command the processor 32 may cause all of the data to be transmitted to the personal computer 40 which may be programmed to be able to identify the data selected by the user. For example, upon linking the PDA 14 to the personal computer 40 with the cable 44, the personal computer 40 may be programmed to launch a data guide program [not shown] that causes a listing of the various data sets stored in the PDA memory 34 to be displayed. Or, the television controller 22 (see FIG. 1) may be programmed to be able to analyze the data transmitted in the digital VSB broadcast signal and may further be programmed to respond to a request from the PDA 14 for a specific set of data by transmitting only the specific set of requested data to the PDA 14.

The PDA 14, in addition to having the data transfer and storage capabilities described herein may further include features that enable, for example, the organization and storage of a daily calendar, and/or the storage and retrieval of data such as telephone numbers and/or addresses. The PDA 14 may additionally include other features such as, for example, telephone signal reception/processing in order to facilitate retrieval of telephone messages and/or to notify the user of an incoming telephone call, as is performed by a conventional telephone paging system. Of course, the PDA 14 could additionally include a display and other conventional componentry necessary to support these features.

Certain modifications of the present invention have been discussed above. Other modifications will occur to those practicing in the art of the present invention. For example, according to the description above, the IR transceivers 26 and 28 enable communication between the digital television 12 and the PDA 14. However, the IR transceivers 26 and 28 may instead be any other type of wireless link such as an RF or ultrasonic link. Alternatively, the IR transceiver 26 and 28 may instead be replaced with a set of serial data ports that are coupled by a data transmission cable.

Also, it is suggested above that the digital receiver 12 may be a tunable receiver such as a digital television. Alternatively, the digital receiver 12 may be any receiver capable of receiving digital data. For example, the digital receiver 12 may be a radio, a VCR, or a game.

Moreover, as described above, data is stored in the memory 24 for instantaneous or later retrieval by the PDA 14. Instead, however, the data need not be stored in the memory 24, in which case the PDA 14 must retrieve the data from the digital receiver 12 when it is received by the digital receiver 12 or not at all.

Still further, the present invention has been described above at least in part in relation to downloading data transmitted in a digital vestigial sideband (VSB) broadcast signal. However, it should be noted that the present invention also is applicable to downloading data transmitted in other types of digital broadcast signals such as COFDM signals, QAM signals, QPSK signals, and/or the like.

Accordingly, the description of the present invention is to be construed as illustrative only and is for the purpose of teaching those skilled in the art the best mode of carrying out the invention. The details may be varied substantially without departing from the spirit of the invention, and the exclusive use of all modifications which are within the scope of the appended claims is reserved.

What is claimed is:

[1. A data retrieval system for retrieving data from an ATSC compliant digital broadcast signal, wherein the digital broadcast signal includes at least one television programming packet and at least one data packet that contains the data, the system comprising:

a digital receiver adapted to receive the digital broadcast signal and adapted to separate the data from the digital broadcast signal;

a personal digital assistant in communication with the digital receiver, wherein the personal digital assistant includes a device receiver to receive the data from the digital receiver, wherein the personal digital assistant include a memory to store the data, and wherein the personal digital assistant includes a data port to download the data to a computer.]

[2. The data retrieval system of claim 1 wherein the digital receiver comprises:

a tuner that is adapted to tune to the digital broadcast signal;

a demodulator coupled to the tuner and adapted to demodulate the digital broadcast signal;

a controller arranged to acquire the data; and a transceiver coupled to the controller, wherein the controller causes the data to be supplied to the transceiver for transmission to the personal digital assistant.]

[3. The data retrieval system of claim 2 wherein the transceiver comprises a first transceiver, wherein the device receiver comprises a second transceiver, and further wherein the personal digital assistant comprises:

a processor coupled to the memory, wherein the processor causes the data received by the second transceiver to be stored in the memory, wherein the processor is adapted to generate a data request signal for transmission by the second transceiver to the first transceiver, and wherein the data request signal includes a request for the data; and an input device coupled to the processor that accepts input by a user, wherein the input causes the processor to generate the data request signal.]

[4. The data retrieval system of claim 3 wherein the first transceiver receives the data request signal from the second transceiver and transfers the data request signal to the controller and further wherein the controller responds to the data request signal by causing the data to be transmitted to the personal digital assistant.]

[5. The data retrieval system of claim 3 wherein the personal digital assistant further comprises a sound generating circuit coupled to the processor and further wherein the processor causes the sound generating circuit to generate a tone that signals when the data has been stored.]

[6. The data retrieval system of claim 3 wherein the data port comprises a serial data port and further wherein the data is transferred via a data transmission cable to a serial data port associated with the computer.]

[7. The data retrieval system of claim 4 wherein the data request signal generated by the processor identifies a selected portion of the data and further wherein the controller responds to the data request signal by causing the selected portion of the data to be transmitted by the first transceiver to the personal digital assistant.]

[8. The data retrieval system of claim 3 wherein the first and second transceivers are infra-red signal transceivers.]

[9. The data retrieval system of claim 3 wherein the first and second transceivers are radio frequency signal transceivers.]

[10. The data retrieval system of claim 3 wherein the first transceiver comprises a first serial data port, wherein the second transceiver comprises a second serial data port, and wherein the first and second serial data ports are connected by a data transmission cable.]

[11. The data retrieval system of claim 3 wherein the data comprises internet data.]

[12. The data retrieval system of claim 11 wherein the internet data includes website URL data.]

[13. The data retrieval system of claim 12 wherein the internet data further includes information that identifies the website URL data as having been retrieved from the digital broadcast signal.]

[14. The data retrieval system of claim 3 wherein the digital receiver further comprises a digital television, and further wherein the television programming packet transmitted with the data packet is related to the data contained in the data packet.]

[15. The data retrieval system of claim 14 wherein the television programming packet comprises a television commercial for advertising a product and wherein the data comprises information related to the product.]

[16. The data retrieval system of claim 15 wherein the information related to the product comprises a URL for locating a website, and wherein the website includes further information related to the product.]

[17. The data retrieval system of claim 16 wherein the further information related to the product comprises a list of retailers that sell the product.]

[18. The data retrieval system of claim 16 wherein the further information related to the product comprises pricing information for the product.]

[19. The data retrieval system of claim 16 wherein the further information related to the product comprises a coupon for the product.]

[20. The data retrieval system of claim 15 wherein the data further comprises coupon data for the product.]

[21. The data retrieval system of claim 20 wherein the computer is adapted to store the coupon data on a smart card.]

[22. The data retrieval system of claim 1 wherein the personal digital assistant further comprises a display.]

[23. The data retrieval system of claim 1 wherein the personal digital assistant is further adapted to receive and process telephone signals.]

[24. A personal digital assistant comprising:

an input device providing an interface with a digital receiver and an output device providing an interface with a computer;

a memory; and a controller, wherein the controller is arranged to read data at the input device, wherein the data at the input device is acquired from a digital receiver that receives the data in a digital broadcast signal, and further wherein the controller is arranged to cause the data to be stored in the memory and to cause the data to be transferred from the memory to the output device.]

[25. The personal digital assistant of claim 24 wherein the input and output devices are transceivers.]

[26. The personal digital assistant of claim 24 wherein the input and output devices are data ports.]

[27. The personal digital assistant of claim 24 wherein one of the input and output devices is a transceiver and the other of the input and output devices is a data port.]

[28. The personal digital assistant of claim 24 wherein the digital receiver comprises a digital television.]

[29. The personal digital assistant of claim 24 wherein the output device is adapted to transfer the data to a personal computer.]

[30. A method implemented by a personal digital assistant of retrieving data transmitted in a digital broadcast signal comprising the following steps:

a) acquiring at the personal digital assistant the data from a digital receiver that receives the digital broadcast signal;

b) storing the data in a memory of the personal digital assistant; and c) transferring the data from the memory of the personal digital assistant to a computer that is separate from the digital receiver and that is separate from the personal digital assistant.]

[31. The method of claim 30 wherein the step of acquiring the data from a digital receiver comprises the step of acquiring data from a digital television.]

[32. The method of claim 30 wherein the step of acquiring the data from the digital receiver that receives the digital broadcast signal comprises the step of receiving the data at an input device from the digital receiver that receives the digital broadcast signal; and wherein the step of transferring the data from the memory to the computer that is separate from the digital receiver comprises the steps of a) transferring the data from the memory to an output device, and b) transferring the data from the output device to the computer that is separate from the digital receiver; and further wherein the input and the output devices are transceivers.]

[33. The method of claim 30 wherein the step of acquiring the data from the digital receiver that receives the digital broadcast signal comprises the step of receiving the data at an input device from the digital receiver that receives the digital broadcast signal, and wherein the step of transferring the data from the memory to the computer that is separate from the digital receiver comprises the steps of a) transferring the data from the memory to an output device, and b) transferring the data from the output device to the computer that is separate from the digital receiver and further wherein the input and the output devices are data ports.]

[34. The method of claim 30 wherein the step of acquiring the data from the digital receiver that receives the digital broadcast signal comprises the step of receiving the data at an input device from the digital receiver that receives the digital broadcast signal; and wherein the step of transferring the data from the memory to the computer that is separate from the digital receiver comprises the steps of a) transferring the data from the memory to an output device, and b) transferring the data from the output device to the computer that is separate from the digital receiver; and further wherein one of the input and output devices is a transceiver and the other of the input and output devices is a data port.]

[35. The method of claim 30 wherein the step of acquiring the data from the digital receiver comprises the steps of a) transmitting a data request signal to the digital receiver; b) causing the digital receiver to transmit the data to the memory in response to the data request signal; and c) receiving the data transmitted by the data receiver.]

*36. A data retrieval method in a mobile device connected to both a digital equipment and a micro-processor based device, comprising:*

*receiving at least one additional data bounded to a digital content from a digital equipment;*

*processing the at least one of additional data bounded to the digital content, wherein the additional data comprised at least one of an electronic coupon or URL (Uniform Resource Locator);*

*storing the at least one of the electronic coupon or URL included in the additional data bounded to the digital content into a memory; and*

*transferring the electronic coupon or URL stored in the memory to a micro-processor based device.*

*37. The method of claim 36, further comprising:*

*generating a beep that alerts a user that the at least one of an electronic coupon or URL bounded to the digital content has been successfully retrieved from the digital equipment; and*

*displaying audibly that the at least one of an electronic coupon or URL bounded to the digital content is available.*

*38. The method of claim 36, further comprising:*

*causing a light emitting diode (LED) to flash; and*

*displaying visually that the at least one of an electronic coupon or URL bounded to the digital content is available.*

*39. The method of claim 36, wherein the digital equipment corresponds to a digital television, and the micro-processor based device corresponds to a personal computer including a software program that enables an web-browsing.*

*40. The method of claim 36, further comprising:*

*storing a daily calendar, telephone numbers and addresses; and*

*processing telephone signal to notify a user of an incoming telephone call.*

*41. A mobile device connected to both a digital equipment and a micro-processor based device, the mobile device comprising:*

*a transceiver configured to receive at least one additional data bounded to a digital content from a digital equipment;*

*a processor configured to process the at least one of additional data bounded to the digital content, wherein the additional data comprised at least one of an electronic coupon or URL (Uniform Resource Locator);*

*a memory configured to store the at least one of the electronic coupon or URL included in the additional data bounded to the digital content; and*

*a data port configured to transfer the electronic coupon or URL stored in the memory to a micro-processor based device.*

*42. The mobile device of claim 41, wherein the processor generates a beep that alerts a user that the at least one of an electronic coupon or URL bounded to the digital content has been successfully retrieved from the digital equipment, and displays audibly that the at least one of an electronic coupon or URL bounded to the digital content is available.*

*43. The mobile device of claim 41, wherein the processor causes a light emitting diode (LED) to flash, and displays visually that the at least one of an electronic coupon or URL bounded to the digital content is available.*

*44. The mobile device of claim 41, wherein the digital equipment corresponds to a digital television, and the micro-processor based device corresponds to a personal computer including a software program that enables an web-browsing.*

*45. The mobile device of claim 41, wherein the memory stores a daily calendar, telephone numbers and addresses, and the processor processes telephone signal to notify a user of an incoming telephone call.*

* * * * *